United States Patent
Del Garbino et al.

(10) Patent No.: US 6,749,176 B2
(45) Date of Patent: Jun. 15, 2004

(54) ELLIPTICAL VALVE WITH NOMINAL FLOW ADJUSTMENT

(75) Inventors: Robert A. Del Garbino, Tempe, AZ (US); Joseph W. Michalski, Jr., Phoenix, AZ (US)

(73) Assignee: Scientific Monitoring Inc., Scottsdale, AZ (US)

(*) Notice: Subject to any disclaimer, the term of this patent is extended or adjusted under 35 U.S.C. 154(b) by 262 days.

(21) Appl. No.: 09/961,216

(22) Filed: Sep. 21, 2001

(65) Prior Publication Data
US 2002/0079474 A1 Jun. 27, 2002

Related U.S. Application Data

(60) Provisional application No. 60/235,042, filed on Sep. 25, 2000.

(51) Int. Cl.[7] .................................................. F16K 3/00
(52) U.S. Cl. ........................ 251/212; 251/901; 251/902
(58) Field of Search ............................... 251/212, 901, 251/902

(56) References Cited

U.S. PATENT DOCUMENTS

| | | | |
|---|---|---|---|
| 2,390,150 A | * 12/1945 | Johnson et al. | 251/212 |
| 2,784,922 A | * 3/1957 | Richert | 251/212 |
| 2,928,409 A | 3/1960 | Johnson et al. | 137/82 |
| 3,174,716 A | 3/1965 | Salter | 251/129 |
| 3,848,799 A | * 11/1974 | Day | 251/212 |
| 3,951,168 A | * 4/1976 | Roberts | 251/901 |
| 4,474,212 A | * 10/1984 | Schmitz | 251/901 |
| 4,952,835 A | 8/1990 | Stahlhuth | 310/328 |
| 5,020,567 A | * 6/1991 | Proulx | 251/901 |
| 5,030,873 A | 7/1991 | Owen | 310/337 |
| 5,238,023 A | * 8/1993 | Olofsson | 251/901 |
| 5,262,696 A | 11/1993 | Culp | 310/328 |
| 5,327,041 A | 7/1994 | Culp | 310/328 |
| 5,729,077 A | 3/1998 | Newnham et al. | 310/328 |
| 5,798,600 A | 8/1998 | Sager et al. | 310/330 |
| 5,816,780 A | 10/1998 | Bishop et al. | 417/322 |
| 5,866,971 A | 2/1999 | Lazarus et al. | 310/328 |
| 6,003,836 A | 12/1999 | Cewers | 251/129.06 |
| 6,237,630 B1 | * 5/2001 | Stone et al. | 251/212 |

* cited by examiner

Primary Examiner—John Bastianelli
(74) Attorney, Agent, or Firm—The Halvorson Law Firm

(57) ABSTRACT

A valve for the accurate control of fluid flowing through the valve. The valve has a valve body and a flow control mechanism. The valve body is a two-part body having a fluid flow section and a valve adjustment section. The fluid flow section has a fluid flow cavity. The fluid flow cavity further includes a flow control orifice area, which flow control surface being smaller in cross-sectional area than the fluid flow cavity. The flow control mechanism is able to vary the length of its major axis via a force provided by the valve actuator. As the major axis of the flow control mechanism decreases, the minor axis of the flow control mechanism increases at an amplified rate, said increase in the minor axis of the flow control mechanism accomplishes flow control and in combination with the valve actuator, flow control and fluid modulation.

5 Claims, 9 Drawing Sheets

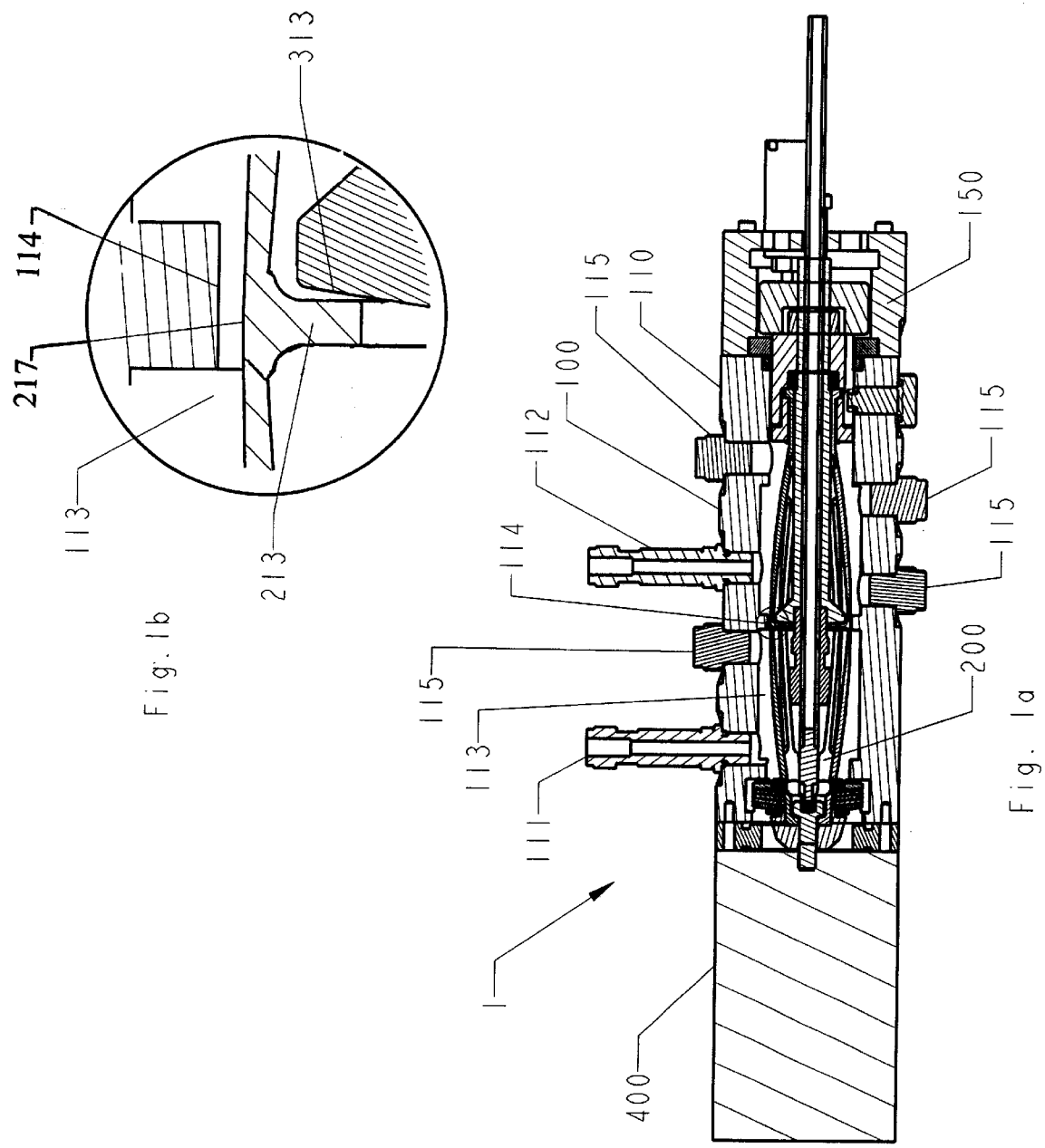

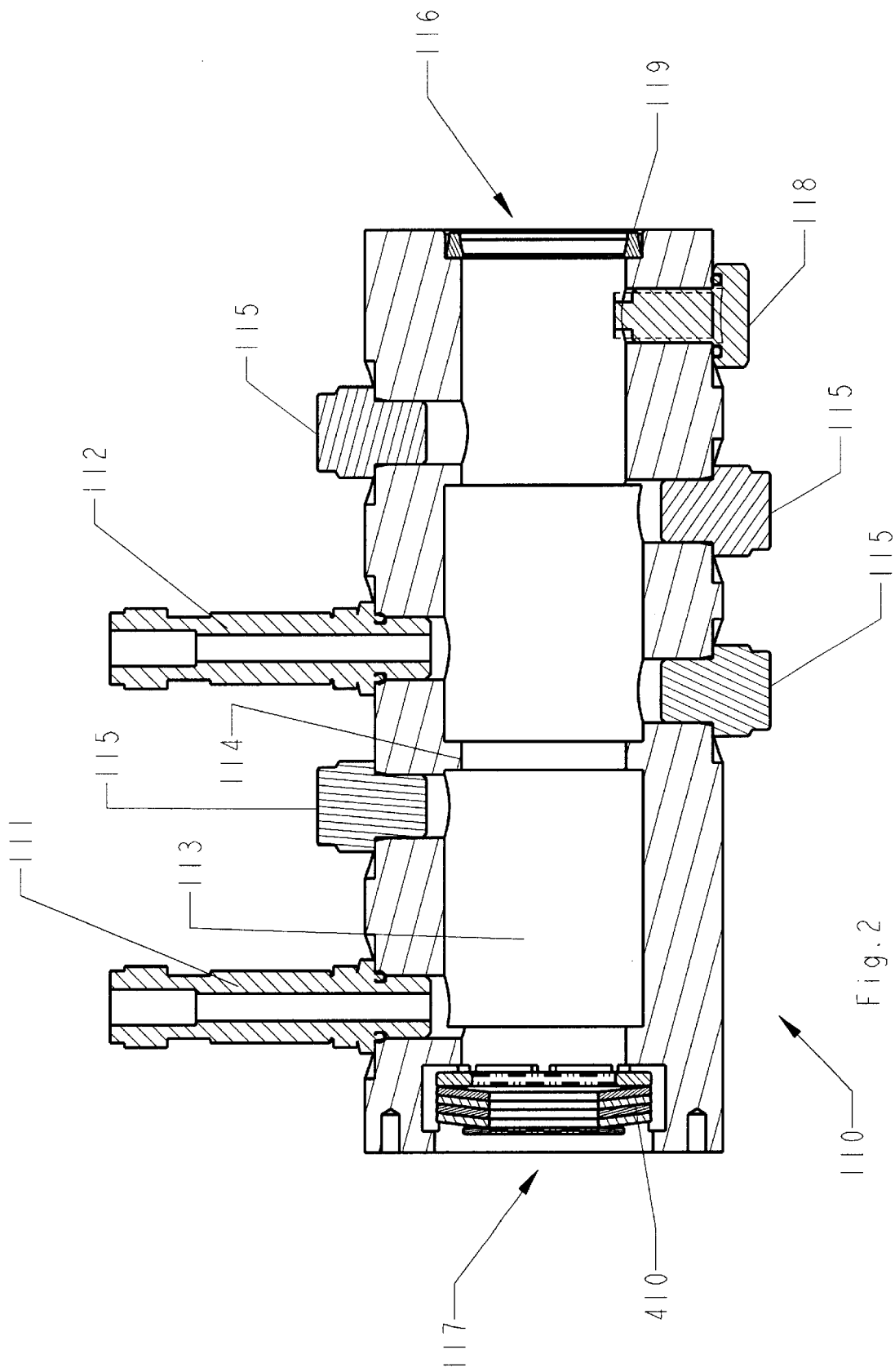

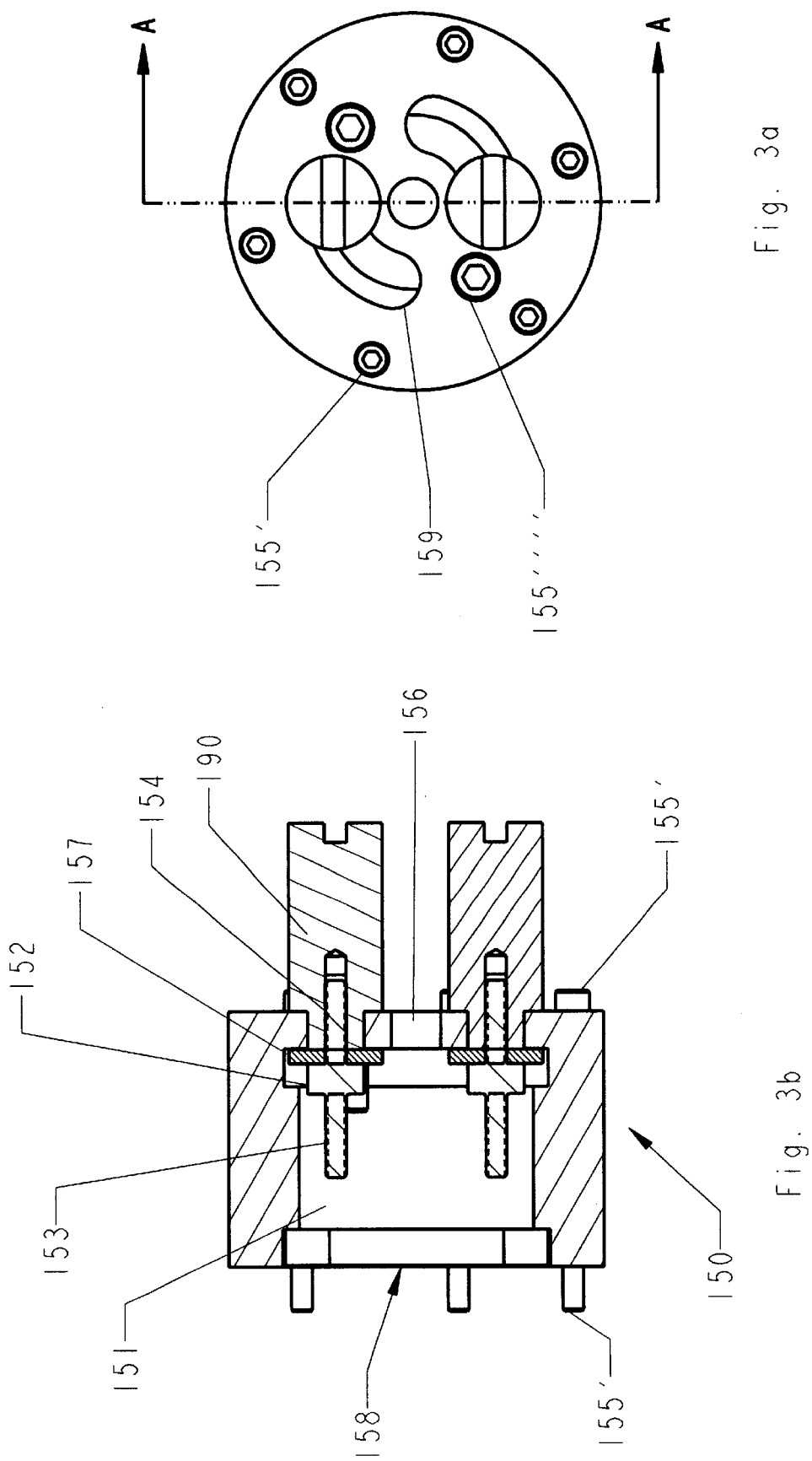

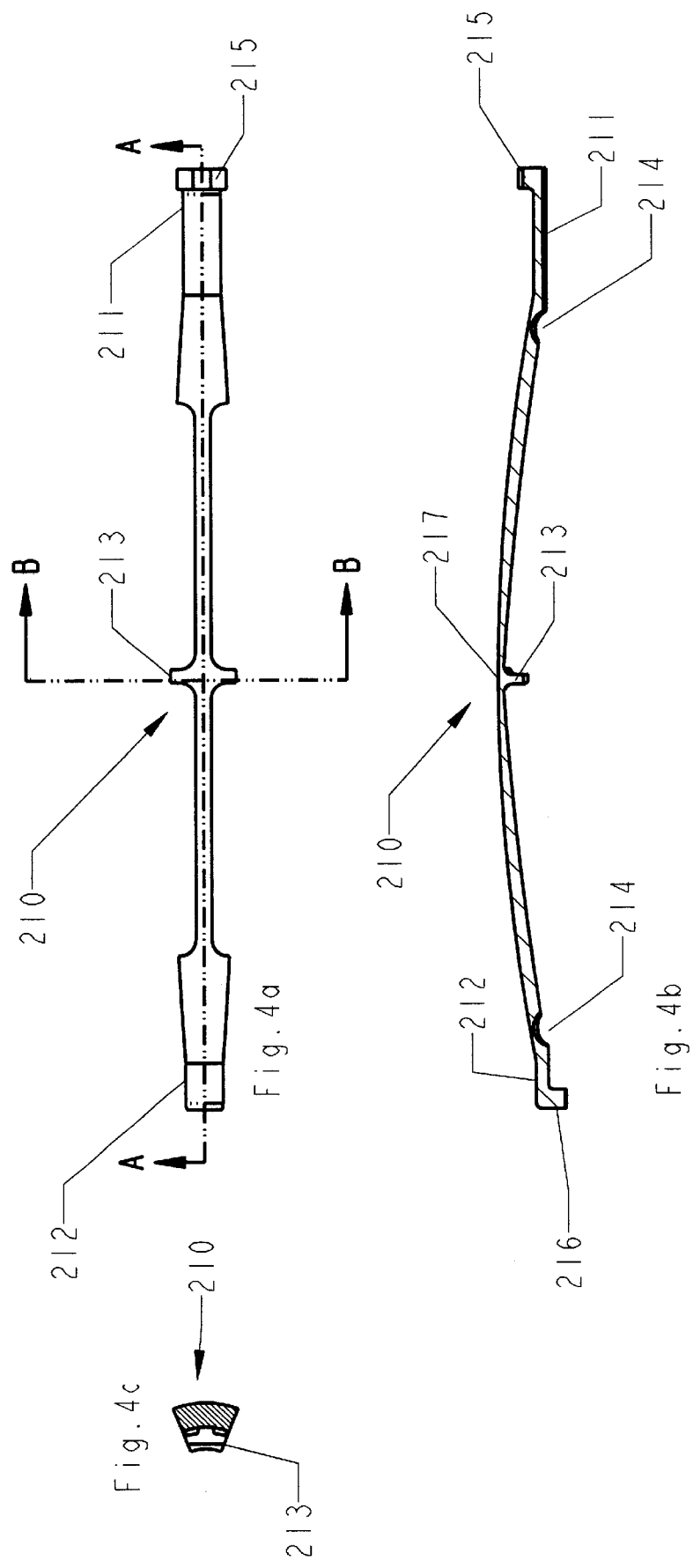

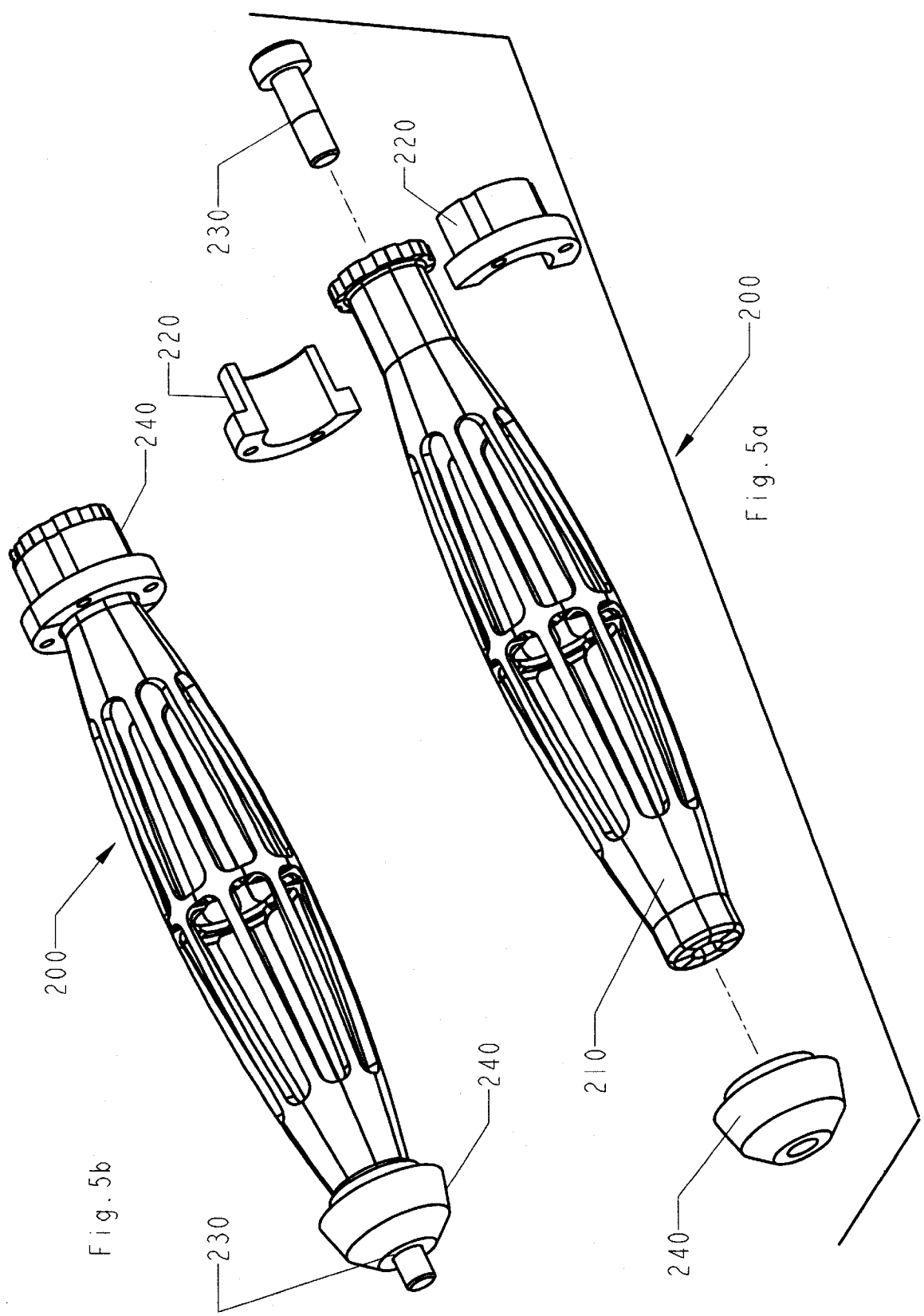

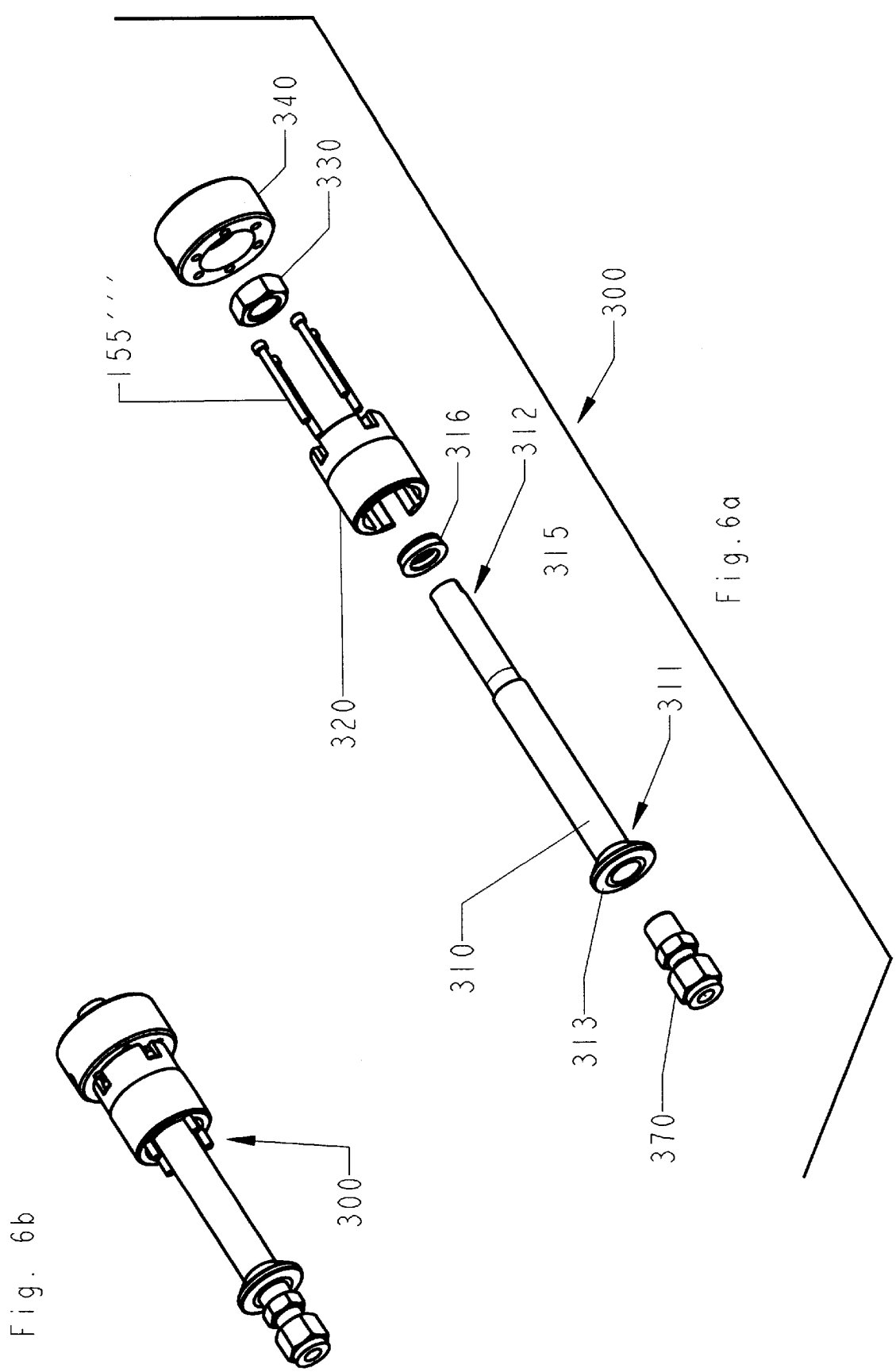

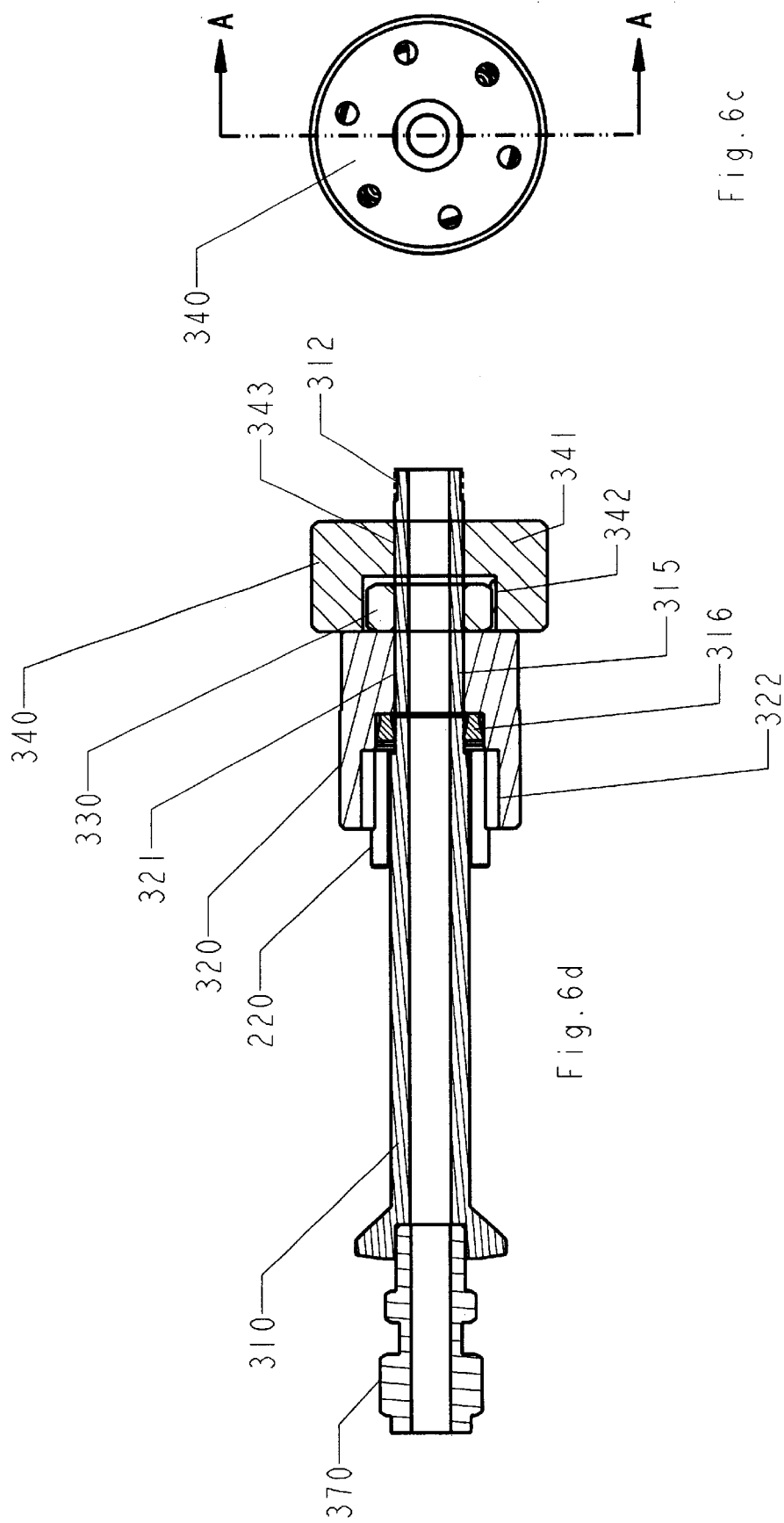

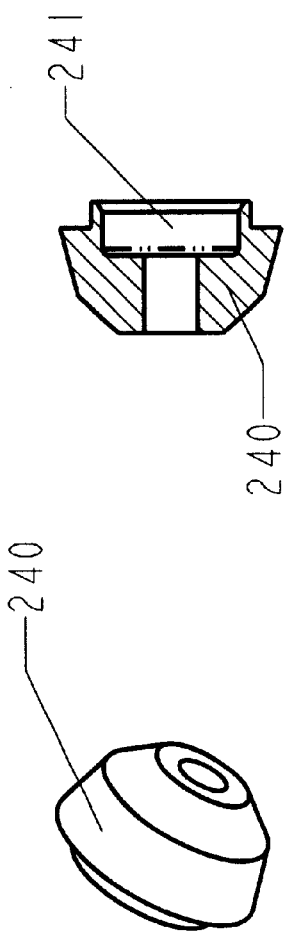
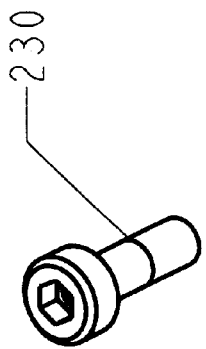
Fig.7a
Fig.7b
Fig.8
Fig.9

ELLIPTICAL VALVE WITH NOMINAL FLOW ADJUSTMENT

This application is a continuation-in-part of provisional application serial no. 60/235,042, which was filed on Sep. 25, 2000.

FIELD OF THE INVENTION

The present invention relates to a novel valve design for controlling fluid flow. More specifically, the present invention relates to a fluid flow valve that incorporates an elliptically shaped flow control member.

BACKGROUND

Active combustor stabilization control in a turbine engine may include the use of several fluidic valves located about the annulus of the engine combustor. Also, desirably, the opening and closing rate capability of such valves should be on the order of ½ kHz to 1 kHz. However, typical available valves are capable of operating only up to about 300 times in one second.

U.S. Pat. No. 3,174,716 suggests the use of a bowed spring for variably restricting a pressure port in response to magnetostrictively generated changes in the location of one end of the spring. This patent also suggests magnetostrictively generated changes in the separation between the ends of a bowed spring to control the opening and closing of a pair of electrical contacts. The patent points out that the bow spring amplifies the relatively small magnetostrictively generated dimensional changes to allow practical use of those changes. Magnetostrictive actuators require the continuous application of power to maintain their activated position. Additionally, the gain of magnetostrictive materials decreases significantly with increasing temperature. Finally, the overall life of the spring element is shortened by the preloading required by the magnetostrictive actuator.

A number of piezoelectric valves have been proposed for these purposes, which embody a valve element in the form of either a circular disc or a beam. The circular disc or beam element is usually a laminated structure having a piezoelectric ceramic wafer bonded to one or both major surfaces of a substrate having a different coefficient of expansion from the wafers. Alternatively, the valve element may comprise two oppositely polarized piezoelectric ceramic wafers of differing coefficients of expansion and bonded to each other in face to face relationship. Application of an electric field to the wafers causes the so constructed element to deflect in the same way as a bimetallic strip.

U.S. Pat. No. 4,545,561 describes and claims a piezoelectric valve for controlling fluid flow. The valve includes a split or two part housing between which parts a shallow and generally cylindrical cavity is formed. The split housing is divided along a parting plane that is parallel to opposite circular end planes of the cylindrical cavity. One part of the housing includes inlet and outlet fluid apertures for incoming and outgoing fluid whereas the other part of the housing contains first and second flexible electric contact elements connectable to opposite terminals of a voltage source. A deformable conductive plate element is captured at its perimeter between the two parts of the split housing and has a piezoelectric wafer bonded on that side thereof opposite from the fluid apertures and in a position proximate to the center of the plate element such that the piezoelectric wafer is supported by the plate element without contacting the housing at its perimeter.

When assembled, the first flexible electric contact element is pressed into electrical contact with the piezoelectric wafer and the second flexible electric contact element is pressed against the deformable conductive plate element so that, upon actuation of the piezoelectric element by the voltage source, the plate element is caused to travel between a first position in which the plate element occludes the passage of fluid between at least one of the fluid apertures and the cavity and a second position in which the plate element is deformed away from at least one fluid aperture allowing fluid flow through the cavity between the inlet and outlet apertures.

It will, therefore, be appreciated that the valve described in U.S. Pat. No. 4,545,561 is an example of a circular disc type piezoelectric valve in which the disc is captured at its perimeter. On the other hand, a beam element, sometimes referred to as a bender element, type piezoelectric valve is described and claimed in PCT Application WO86/07429. The valve according to WO86/07429 comprises a housing defining a cavity, an inlet conduit means having one end terminating as an inlet orifice, said inlet orifice having a cross sectional area and being at a predetermined location and within said cavity and having another end of said inlet conduit means in fluid communication with a fluid supply; an outlet conduit means having one end terminating as an outlet orifice at a predetermined location within said cavity and said outlet orifice having a predetermined cross sectional area, another end of said outlet conduit means in fluid communication with a means for using fluid from said fluid supply and having an effective fluid storage volume, a bender element appropriately positioned within said cavity and affixed to said housing means, having a means adapted for providing signal communication between said bender element and a controllable flow control signal, said signal effective to cause said bender element to deflect a controlled amount thereby permitting an amount of said fluid to flow at a controlled flow rate through said valve device; and a first sealing means affixed to said bender element to effectively seal, during the absence of said flow control signal, said outlet orifice.

These devices are what is known as two state valves, that is, they are either open or closed. Metering of the fluid flowing through these valves is accomplished by rapidly opening and closing the flow opening. While this approach to the problem of accurate fluid flow control is interesting, there is still a current and continuing need for valves that accurately control the flow of fluid through the valve. Moreover, there is a current and continuing need for a valve that provides analogue type control over the fluid control as opposed to digital or quantum control. Further, it is desirable to provide a short path length and a large area aperture between inlet and outlet plenums of a valve. It is still further desirable to create a high rigidity, low inertia, and therefor, rapidly responding, valve configuration.

SUMMARY OF INVENTION

It is an object of the present invention to provide a valve comprising a valve body having a fluid inlet port, a fluid outlet port, a cavity with flow control surfaces; and a valve mechanism comprising at least one flexible spring strip, each coupled to the valve body and anchored in place at one end relative to the valve body and permitted one degree of freedom, or movable, at another end relative to the valve body.

It is another object of the present invention to provide the valve described above further including an actuator mechanism coupled to the movable end of the flexible spring strip.

It is yet another object of the present invention to provide the valve described above further including an adjustment mechanism coupling the anchored end of the at least one spring strip to the valve body.

It is still yet another object of the present invention to provide the valve described above wherein the adjustment mechanism includes a mechanism for nominal flow adjustment.

It is a further object of the present invention to provide a valve as described above wherein the at least one spring strip is elongated with an anchor end and an adjustment end and further comprises a flow blocking dam located approximately between the anchor end and the adjustment end.

It is a still further object of the present invention to provide the valve as described above wherein the at least one spring strip further includes at least one flex facilitating detail located adjacent at least one of the anchor end and the adjustment end.

It is a still yet further object of the present invention to provide the valve as described above further including an anchor flange located at the anchor end and an adjustment flange located at the adjustment end of each of the at least one spring strip.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWING

FIG. 1a is a section view of the valve according to the present invention.

FIG. 1b is a partial sectional view of the flow control area of the valve according to the present invention.

FIG. 2 is a sectional view of the flow section of the valve body according to the present invention.

FIG. 3a is an end view of the valve adjustment section of the valve body according to the present invention.

FIG. 3b is a sectional view of the valve adjustment section of the valve body according to the present invention along line A—A of FIG. 3a.

FIG. 4a is a top view of the spring strip according to the present invention.

FIG. 4b is a sectional view of the spring strip according to the present invention along line A—A of FIG. 4a.

FIG. 4c is a sectional view of the spring strip according to the present invention along line B—B of FIG. 4a.

FIG. 5a is an exploded view of the valve mechanism according to the present invention.

FIG. 5b is an perspective view of the valve mechanism according to the present invention.

FIG. 6a is an exploded view of the valve adjustment mechanism according to the present invention.

FIG. 6b is an perspective view of the valve adjustment mechanism according to the present invention.

FIG. 6c is an end view of the valve adjustment mechanism according to the present invention.

FIG. 6d is a section view of the valve adjustment mechanism according to the present invention along line A—A of FIG. 6c.

FIG. 7a is an perspective view of the plunger according to the present invention.

FIG. 7b is a sectional view of the plunger according to the present invention.

FIG. 8 is an perspective view of the gasket diaphragm according to the present invention.

FIG. 9 is an perspective view of the bolt with sensor face according to the present invention.

DETAILED DESCRIPTION OF PREFERRED EMBODIMENTS

Figure 10:
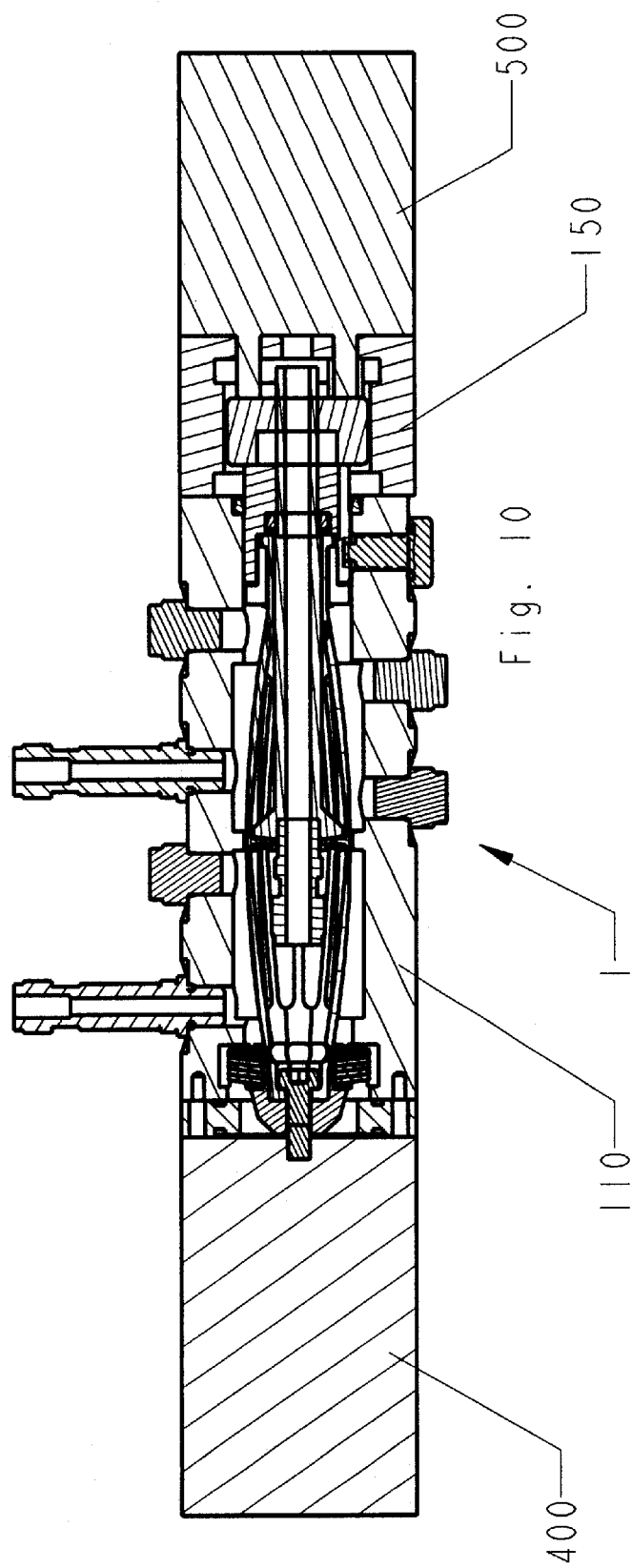
FIG. 10 is a sectional view of an alternate embodiment wherein a piezo adjuster replaced the manual adjuster.

The present invention is a valve that is useful for the accurate control of fluid flow.

As illustrated in FIG. 1a, the valve 1 of the present invention comprises a valve body 100 and a flow control mechanism 200. In the preferred embodiment, the valve body 100 is a two-part body having a fluid flow section 110, separately illustrated in FIG. 2, and a valve adjustment section 150, separately illustrated in FIGS. 3a and 3b. Necessarily, the fluid flow section 110 has a fluid flow inlet 111 and a fluid flow outlet 112. The fluid flow section 110 further comprises a fluid flow cavity 113, which is in fluid communication with the fluid flow inlet 111 and the fluid flow outlet 112. The fluid flow cavity 113 further includes a flow control orifice area 114, more clearly illustrated in FIG. 1b, which is smaller in cross-sectional area than the fluid flow cavity 113 in order to reduce unwanted effects, such as the venturi and the like. In a preferred embodiment, the fluid flow cavity 113 has at least two openings in addition to the openings necessary for the fluid flow inlet 111 and the fluid flow outlet 112, one opening 116 for receiving a valve adjustment mechanism 300 and the other 117 opening for connecting to a valve actuator mechanism 400. Located at the opening 116 for receiving the valve adjustment mechanism 300, is a seal 119 for providing a fluid tight seal between the fluid flow section 110 and the valve adjustment section 150. Further, there is a clocking chuck 118 located near the opening 116 for receiving the valve adjustment mechanism that is rotatingly insertable into the fluid flow cavity 113 and thereby preventing unwanted rotation of the valve adjustment mechanism 300. Finally, there may be, at the customer or manufacturers discretion, additional openings 115 for fluid connection to sensing elements and the like.

The valve adjustment section 150, illustrated in FIGS. 3a and 3b has a cavity 151 that preferably has at least one opening. The one opening 158 is for the valve adjustment mechanism 300, which is substantially housed in the valve adjustment section 150, to extend through. The valve adjustment section 150 attaches to the fluid flow section by means common in the industry, such as bolts 155' or the like. The valve adjustment section 150 also includes at least two adjustment screws 152, each of which has an inner end 153 and an outer end 154. The inner end 153 threadingly screws into an end of the valve, for adjustment, as will be described in more detail below. The outer end 154 treadingly screws into a head 190 that is preferably knurled on the outside and slotted at the end (both features of which are common in the industry for adjustment type heads and screws). There is a washer 157 that is inserted on the outer end, between the adjustment screws 152 and the valve adjustment section 150. Further, the valve adjustment section 150 preferably will have arcuate channels 159 into which the valve adjustment screws are inserted. The arcuate shape of the channels 159 allow for variations in the clocking of the valve assembly as it is initially, or nominally, adjusted. In the most preferred embodiment, the valve adjustment section 150 may include an opening for sensors 156 and the like. Finally, there are preferably at least one, more preferably two, locking screws or bolts 155"", that are used to lock the valve assembly into place once the final adjustment is accomplished.

The flow control mechanism 200, illustrated in FIGS. 5a–5c, is comprised of at least three, preferably eight, spring strips 210, which are illustrated in FIGS. 4a–4c. The spring strips 210 are generally elongated pieces of relatively flexible material such as steel, spring steel, titanium or the like. There are at least one spring strip 210, with the most preferred number being eight as is illustrated in the figures. Each spring strip 210 has an anchor end 211 and a movable adjustment end 212. Located approximately equidistant between the anchor end 211 and the adjustment end 212 is a flow blocking dam 213 on an inner side and a flow control surface 217 on an outer side. The flow blocking dam 213 works in combination with the valve adjustment mechanism 300 as is illustrated in FIG. 1b, and described in greater detail below. Located adjacent at least one of each of the anchor end 211 and the adjustment end 212 is a flex facilitating detail 214. While the material of the spring strip 210 is in itself relatively flexible, the flex facilitating details 214 provide areas of lessened stiffness such that substantially all flexing of the spring strips 210 occur at the flex facilitating details 214. Located at the anchor end 211 is an anchor flange 215 that provides a base for securing the anchor end 211 of the spring strip 210 to the valve adjustment mechanism 300. Located at the adjustment end 212 of the spring strip 210 is an adjustment flange 216 that provides a means for securing the adjustment end 212 of the spring strip 210 to the valve actuator mechanism 400. Preferably, the anchor flange 215 and the adjustment flange 216 are located on opposite sides of the spring strip 210. Finally, in its preferred embodiment, the spring strip 210 has a gentle arcuate shape wherein the flow blocking dam 213 is located on the concave surface of the arcuate shape.

As can be seen from FIGS. 5a and 5b, the spring strips 210, when there are more than one, are situated generally side by side to form an enclosed or cage geometric shape. In the preferred embodiment, where there are eight spring strips 210, the shape is generally an ellipsoid shape. The anchor ends are held together with an anchor collar 220 that is preferably in at least two separate pieces, for ease of installation. A bolt 230 with a sensor face, more completely illustrated in FIG. 9, is inserted through the anchor end 211 of the flow control mechanism 200, threaded portion first. The threaded portion then extends through the adjustment end 212 of the flow control mechanism 200 and is held in place by a plunger 240, more completely illustrated in FIGS. 7a and 7b. The bolt 230 is ultimately attached by threading into the actuator mechanism 400. The plunger 240 is has a cavity 241 that receives the adjustment end 212 of the flow control mechanism 200 and thus holds the adjustment end 212 together.

The valve adjustment mechanism 300, illustrated in FIGS. 6a–6d, is comprised of an innerflow stop 310, a spring strip anchor 320, a first lock nut 330, and a flow control adjustment shank 340.

The innerflow stop 310 has at least two ends, a flow stop end 311 and a partially threaded anchor end 312. The flow stop end 311 has a spring strip contact surface 313 that is slightly angled from perpendicular to the major axis of the innerflow stop 310. The longitudinal orientation between the spring strip contact surface 313 and the flow control orifice area 114 is controlled by the valve adjustment mechanism 300 to account for variations in machining tollerences. The innerflow stop 310, in the preferred embodiment, has a shaft 315 that extends between the flow stop end 311 and the anchor end 312.

The spring strip anchor 320 has an axial channel 321 through which the shaft 315 of the innerflow stop 310 is snuggly, but freely, received. There is a spring strip anchor cavity 322 that accommodates the anchor ends of the spring strips 210. Preferably, the spring strip anchor 320 further includes at least one bolt receiving aperture that extends substantially coaxial with the axial channel 321. A seal 316 is coaxially inserted between the second spring strip anchor 220 and the spring strip anchor 320. While the at least one bolt receiving aperture is not threaded, it does receive the bolts 155''' that are ultimately threaded into the second spring strip anchor 220.

The first lock nut 330 is threaded complementarily to the partial threading on the anchor end 312 of the innerflow stop 310. Thus, once the shaft 315 of the innerflow stop 310 has been inserted through the axial channel 321 of the spring strip anchor 320, the first lock nut 330 is rotatingly screwed onto the partial threads located on the shaft 315 of the innerflow stop 310. A portion of the anchor end 312 of the innerflow stop 310 extends beyond the first lock nut 330 when it has been screwed onto the innerflow stop 310.

The flow control adjustment shank 340 has a body 341 with an innerflow end receiving cavity 342 at one end and a complementarily threaded shaft aperture 343 at another end. The shaft aperture 343 is threaded to receive the complementarily threads on the anchor end 312 of the innerflow stop 310. Not shown is at least one clocking chuck channel that extend longitudinally along the outer surface of the flow control adjustment shank 340 and which receives the clocking chuck screw 118.

Finally, a sensor may be inserted or attached to the flow stop end 313 of the innerflow stop 310 via a compression type fitting 370, or the like, to allow for the monitoring of conditions within the valve 1 itself. The sensor 370 is electronically attached to monitoring equipment via leads that run through a central or axial channel that is found in all of the components of the adjustment mechanism 300.

Fluid flow control is achieved by the adjustment of the separation distance between the flow control orifice area 114 and the flow control surface 217. Thus, it can be easily seen that as the length of the major axis of the flow control mechanism 200 is decreased and the minor axis increased at an amplified rate, the separation distance is decreased, fluid flow is restricted. Likewise, as the length of the major axis is increased and the minor axis decreased at an amplified rate, fluid flow is increased.

Nominal fluid flow adjustment is accomplished using the adjustment mechanism 300. Once the valve 1 has been assembled, nominal flow is adjusted by changing the longitudinal position of the adjustment mechanism 300. This is accomplished either manually using the two adjustment screws 152 or controlled via a nominal flow actuator mechanism 500. These two mechanisms will move the adjustment mechanism 300 longitudinally, thereby changing the length of the major and minor axis of the fluid control mechanism 200. The nominal flow adjustment may be accomplished either in a static setting (valve not in use) or in a dynamic setting (valve in use).

Fluid leakage is controlled using the flow blocking dam 213, which is contact with the spring strip contact surface 313 in order to prevent unwanted fluid flow (leakage). This position is defined and maintained by threading innerflow stop 310 into the spring strip anchor 320. This position is then maintained by the first lock nut 330. As each of the at least one spring strips 210 are flexed during the adjustment and/or operation procedures, this contact is preferably maintained.

Because of its construction, the flow control mechanism 200 is able to vary the length of its major axis via a force provided by the valve actuator 400. As the major axis of the flow control mechanism 200 decreases, the minor axis of the flow control mechanism 200 increases at an amplified rate. Said increase in the minor axis of the flow control mechanism 200 accomplishing flow control.

Hydro-locking between the inside and outside of the flow control mechanism 200 is prevented by scalloping the spring strips 210. The scalloped springs avoid hydro-locking the valve 1 when operating with an incompressible fluid medium.

Modulation of the fluid flow is accomplished by coupling the flow control mechanism 200 to a valve actuator mechanism 400, in combination with an intervening spring bias structure 410. While it is preferred that the valve actuator mechanism 400 is piezo-electric, other actuators may be used and still fall within the scope of the present invention. Preferably, the spring bias structure 410 is at least one stacked spring washer. The spring bias structure 410 is located radially around the plunger 210 and provides a restoring force when the valve actuator mechanism 400 retreats from an advanced position. Intermediate between the plunger 240 and the valve actuator mechanism is the gasket diaphragm illustrated in FIG. 8.

As can be seen from FIG. 10, the manual adjustment screws 152, described above, can be replace with an electronically operated nominal flow actuator mechanism 500, which is preferably piezo-electric but may be other mechanism and still fall within the scope of the present invention.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A valve comprising:
   a. a valve body having a fluid inlet port, a fluid outlet port, a cavity with a flow control orifice area;
   b. a valve mechanism comprising at least one flexible spring strip, each coupled to the valve body and anchored in place at one end relative to the valve body and movable at another end relative to the valve body, each of said spring strips further comprising a flow control surface positioned in alignment with the flow control orifice area; and the at least one spring strip is elongated with an anchor end and an adjustment end and further comprises a flow blocking dam located approximately between the anchor end and the adjustment end.

2. The valve according to claim 1 wherein the at least one spring strip further includes at least one flex facilitating detail located adjacent at least one of the anchor end and the adjustment end.

3. The valve according to claim 2 further including an anchor flange located at the anchor end and an adjustment flange located at the adjustment end of each of the at least one spring strip.

4. A valve comprising:
   a. a valve body having an fluid inlet port, a fluid outlet port, a cavity with a flow control orifice area;
   b. a valve mechanism comprising at least one flexible spring strip, each coupled to the valve body and anchored in place at one end relative to the valve body and movable at another end relative to the valve body, each of said spring strips further comprising a flow control surface positioned in alignment with the flow control orifice area; and
   c. an actuator mechanism coupled to the movable end of the flexible spring strip; and
   d. an adjustment mechanism coupling the anchored end of the at least one spring strip to the valve body.

5. The valve according to claim 4 wherein the adjustment mechanism includes a mechanism for nominal flow adjustment.

* * * * *

UNITED STATES PATENT AND TRADEMARK OFFICE
CERTIFICATE OF CORRECTION

| | | |
|---|---|---|
| PATENT NO. | : 6,749,176 B2 | Page 1 of 1 |
| APPLICATION NO. | : 09/961216 | |
| DATED | : June 15, 2004 | |
| INVENTOR(S) | : Robert A. Del Garbino and Joseph W. Michalski, Jr. | |

It is certified that error appears in the above-identified patent and that said Letters Patent is hereby corrected as shown below:

On column 1, line 3 of the specification add the following --This invention was made with Government support under contract F33615-00-C-2015 with the United States Air Force. The Government has certain rights in this invention--.

Signed and Sealed this

Twenty-sixth Day of August, 2008

JON W. DUDAS
*Director of the United States Patent and Trademark Office*